United States Patent Office 2,814,932
Patented Dec. 3, 1957

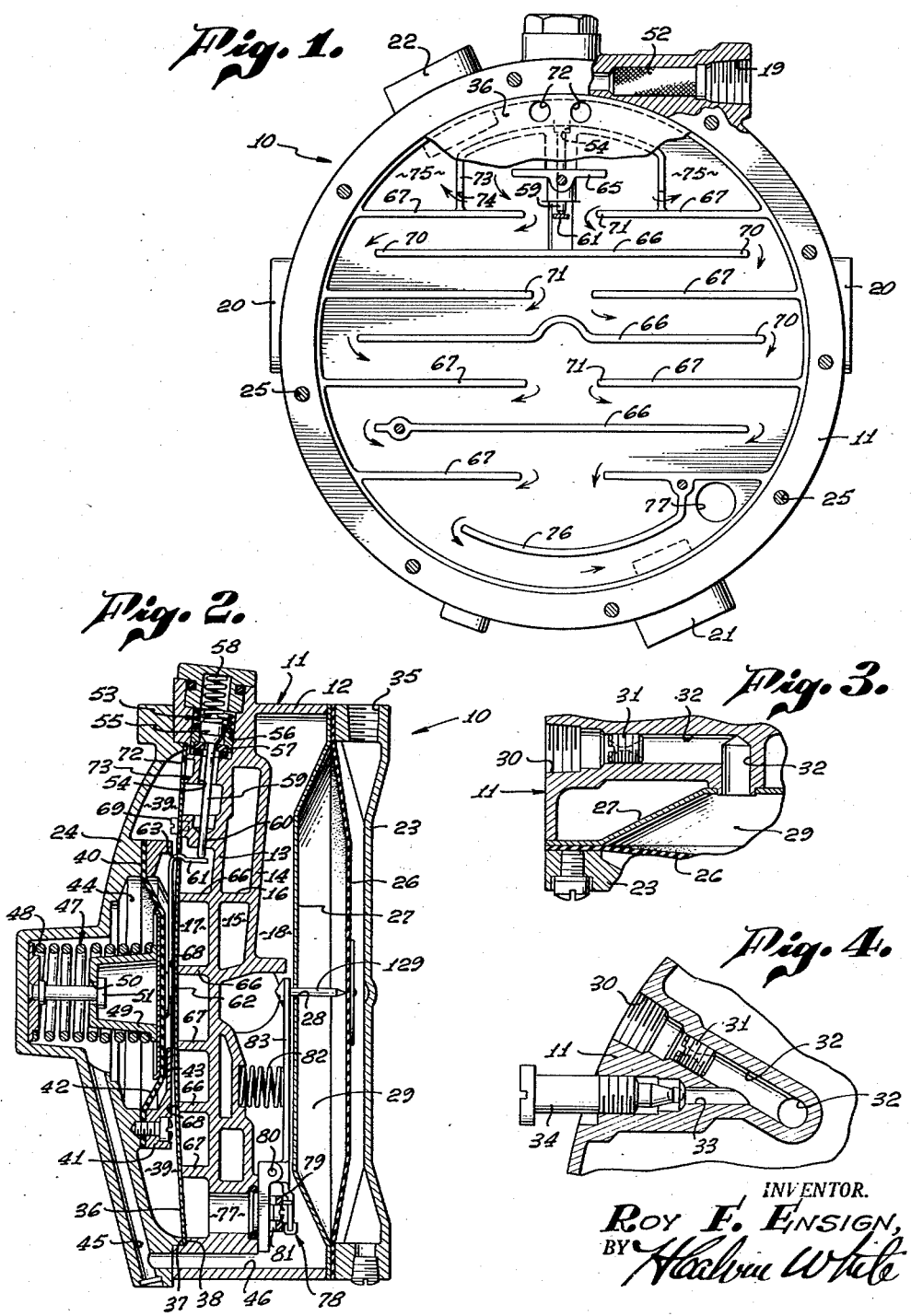

2,814,932

FLUID VAPORIZING PRESSURE REGULATOR

Roy F. Ensign, San Marino, Calif., assignor to Ensign Carburetor Company, Huntington Park, Calif., a corporation of California Application February 21, 1955, Serial No. 489,683

13 Claims. (Cl. 62—1)

This invention has to do generally with fluid pressure regulators adapted for reducing pressures derived from high pressure sources and for regulating delivered pressures, and more particularly concerns structural improvements in such devices having for their purpose to ensure vaporization of volatile fluids, such as fuels, with increased efficiency of pressure regulation and over-all operation. The pressure regulator forming the present invention is typically used for delivering fuel gas to internal combustion engines at regulated pressures, and the invention will therefore be explained as related to that particular use, but without limitation thereto except as hereinafter provided.

Such regulators are typically constructed to have high and low pressure chambers on opposite sides of a heating chamber for reducing the fuel pressure in two stages and for vaporizing any liquid fuel passing into the regulator from the high pressure source before ultimate delivery of fuel gas to the engine. In the use of these pressure regulating devices, certain problems are encountered having to do with incomplete vaporization of fuel droplets as they pass through the pressure regulator leading to unsatisfactory operation thereof, as exemplified by frost formation on exterior surfaces thereof and reduced delivery rates of vaporized fuel gas to the engine. For example, it has been discovered that to a certain extent fuel droplets tend to pass through the regulator without vaporizing, and also to collect in pockets or recesses located out of the direct fuel flow path through the high pressure chamber, and more particularly in and around that side of the high pressure chamber associated with the inlet valve controlling diaphragm. The general objectives of the present invention are therefore directed to overcoming these and other associated problems and difficulties through improved control of fuel flow through the regulator to achieve increased fuel vaporization and reduced frost formation on regulator surfaces, improved heat transmission into the volatile fuel coursing through the regulator and general over-all improved operation thereof.

In accordance with the above objects and purposes, the high pressure chamber in the regulator in which fuel gas is vaporized is provided with a vertical series of spaced baffles extending transversely and substantially parallel therein relative to the generally vertically elongated orientation of the pressure chamber established by mounting it in that condition. The baffles are so arranged relative to the gas inlet in the upper portion of the chamber and outlet in the bottom portion of the chamber that the flow of fluid therethrough is caused to cascade downwardly over vertically staggered overflow edges of the baffles during operation of the regulator. More particularly, the downward flow is repeatedly divided and combined by the baffles while coursing laterally back and forth between them adjacent the heating surfaces presented by a partition separating the heating chamber from the pressure chamber, thereby providing for flow travel over a maximum area of contact with the heating surface. As a result, any fluid droplets entering the pressure chamber are reduced to vapor before leaving the regulator and without collecting in pockets between the baffles.

Another feature of the invention concerns the provision of a spring plate which engages shaped baffle edges lying in a curved surface approximating the natural deflection curvature of the spring plate when its outer edges are loaded in the direction of the baffles. As a result, one side of the spring plate is caused to contact the terminal edges of the baffles with substantailly uniform pressure sufficient in amount to prevent the formation of gaps between the plate and the baffles such as would otherwise tend to collect fuel droplets and short-circuit fuel flow between the baffles.

The invention also concerns itself with the formation of a second high pressure chamber extending between the spring plate and a closure for the regulator body, the second high pressure chamber annularly surrounding a wall formation projecting from the closure toward the plate. The wall formation mounts a diaphragm operatively connected to a valve controlling the pressure inlet to the main or first high pressure chamber. Since the second high pressure chamber is out of the flow path of fuel coursing through the main high pressure chamber it presents a pressure zone isolated from flowing fuel droplets and thus acts to prevent frost formation on the exterior of the regulator while at the same time communicating high pressure to the diaphragm in order that the inlet valve may be properly controlled.

Other features and objects of the invention include the provision of a lever passing through a slot in the plate for communicating movement of the diaphragm to the inlet valve, the lever being hinged by the relatively close fit between it and the plate edges adjacent the slot, the closeness of the fit serving to prevent entrance of liquid fuel particles into the second high pressure chamber. In addition, a pressure passage for communicating pressure between the two high pressure passages is formed in the plate at a point located above the inlet to the high pressure passage when the regulator is vertically oriented during operation, and a suitable baffle is interposed between the inlet and the pressure passage in order to prevent entrance of liquid fuel droplets into the second high pressure chamber.

Other features and objects of the invention as well as the details of an illustrative embodiment will be more fully understood from the following detailed description, in which:

Fig. 1 is an elevational view of the regulator showing interior and exterior portions thereof;

Fig. 2 is an elevation taken in section through the vertically oriented regulator body;

Fig. 3 is an enlarged sectional view of a portion of the interior of the regulator; and Fig. 4 is another enlarged sectional view taken through the regulator body.

As shown in its preferred form, the two stage pressure regulator comprises a body 10 including a central body portion 11 having a peripheral wall 12 and internal partitions 13 and 14 extending directionally across the body of the regulator and enclosing between them a single heating chamber 15 with structural wall segments 16 extending laterally thereacross. On opposite sides of the partitions 13 and 14 are formed respectively high pressure chamber 17 and low pressure chamber 18, both of which also extend across the body of the regulator and which are adapted to be vertically oriented during regulator operation, as shown in Fig. 2. As pointed out in the introduction, fuel is led to the regulator in a high pressure liquefied condition, a suitably threaded inlet connection 19 serving to admit the fuel thereto and low pressure outlets 20 being provided to conduct low pressure fuel gas from chamber 18 for ultimate transmission to an engine intake venturi under pressure conditions determined thereby. A suitable heating medium such as hot water is led into and from the heating chamber 15 through inlet 21 and outlet 22, as shown in Fig. 1.

The regulator body also includes opposite end covers or closures 23 and 24 suitably joined to the central body portion 11 by bolt connections, as indicated by threaded openings 25 in the central casting 10. A low pressure diaphragm 26 and a thin plate 27 are retained between closure 23 and body portion 11, the plate being dished toward chamber 18 to permit diaphragm displacement in response to pressure fluctuations applied to the diaphragm. Plate 27 is centrally apertured at 28 to accommodate a diaphragm contact pin 129 and also to transmit pressure conditions existent in low pressure chamber 18 to chamber 29 formed between plate 27 and diaphragm 26.

As shown in Figs. 3 and 4, chamber 29 is also connected with an outlet 30 via a bleed screw 31 and passages 32. Outlet 30 is normally connected to the engine intake manifold by appropriate tubing, not shown, in order to communicate manifold suction to chamber 29 and thereby to lower the pressure on the diaphragm below what it would otherwise be as a result of venturi suction communicated from chamber 18 to chamber 29 through opening 28. Another opening 33 is provided in the casting 11, as shown in Fig. 4, for bleeding adjustable amounts of gas from chamber 18 to chamber 29, the size of opening 33 being regulated by adjusting screw 34. The opposite side of diaphragm 26 is placed in communication with the atmosphere through an outlet 35 in closure 23 or may be suitably connected to the air intake of the carburetor in order to balance air cleaner resistance.

Closure 24 for the opposite side of casting 11 is dished away from the high pressure chamber 17 from which it is separated by a plate 36, the edges of which are clamped between shoulders 37 and 38 formed respectively in the peripheral walls of the closure 24 and the casting 11. Plate 36 isolates the flow of fuel in high pressure chamber 17 from a second high pressure chamber 39 located between the plate and the closure. Chamber 39 annularly surrounds a wall formation 40 extending centrally and inwardly from the closure toward the second high pressure chamber. A ring 41 holds a high pressure diaphragm 42 against the annular end of the wall formation 40, the ring having an open end wall 43 interposed between the plate and the diaphragm to communicate pressure in the chamber 39 to the face of the diaphragm presented toward plate 36.

The annular wall formation 40 and the diaphragm together form a central reference pressure chamber 44 to which low pressure chamber 18 is connected via passages 45 and 46 formed respectively in the closure 24 and casting 11. Since the pressure communicated to chamber 44 is normally considerably less than the pressure in chamber 39, a large compression spring assembly 47 is mounted in chamber 44 between the closure and the diaphragm to urge the latter toward plate 36 in such manner as to facilitate sensitive diaphragm movement in response to pressure fluctuations in chamber 39 for controlling the inlet valve to be described. Typically, the spring assembly 47 may include a compression spring 48 urging a cupped receptacle 49 against the diaphragm stiffener, the receptacle being centrally apertured at 50 to receive a shouldered stationary pin 51 for limiting expansion of the spring toward plate 36, while accommodating spring compression as controlled by the diaphragm 42.

Liquid fuel conducted to inlet 19 passes via strainer 52 shown in Fig. 1 and inlet valve assembly 53 shown in Fig. 2 through inlet 54 and into the upper portion of high pressure chamber 17 in the regulator body. Valve assembly 53 comprises a valve body 55 carried within a bore 56 and urged toward a valve seat 57 by a compression spring 58, there being a valve stem 59 connected to body 55 and passing into chamber 17 through a guide 60. The end of the stem engages one leg 61 of a bell crank lever typically comprising a piece of flat metal stock having a second right angled leg 62 engaging diaphragm 42 to communicate movement thereof to the valve stem 59. Legs 61 and 62 are connected by a bend 63 passing through a suitable slot formed in the plate 36 in such relation as to form a close-fit with the bend allowing pivoting of the lever but preventing transmission of liquid fuel particles in chamber 17 into chamber 39.

As the pressurized liquid fuel passes through the inlet valve and enters the high pressure chamber through the opening 54 shown in broken lines in Fig. 1, it expands to form a gas and liquid mixture which is sprayed against baffle 65 extending across its flow path. Baffle 65 is the first of a series of central baffles 66 alternately interposed in vertically staggered relation between side baffles 67, all of which extend laterally into the high pressure chamber 17 and substantially horizontally therein when the regulator is mounted vertically for operation. As better shown in Fig. 2, all of the baffles extend from partition 13 laterally away from the partition, and their lateral terminal edges 68 are shaped to lie in a curved surface approximating the natural deflection curvature of thin plate 36, the edges of which are loaded in the direction of the baffles. The plate is typically formed of spring steel, and while its curvature in assembled condition is slight, it is sufficient to uniformly load the baffle edges 68 to effectively seal any gaps therebetween in such manner as to prevent collection of fuel droplets therebetween and also to ensure against short-circuiting of the fuel flow over the baffle edges. Locating screws 69 engaging plate 36 and certain of the baffles conveniently position the plate during its assembly.

The downward flow of fuel through high pressure chamber 17 is confined between plate 36 and partition 13 and directed by baffles 66 and 67 in such manner as to provide for maximum vaporization of fuel droplets passing through the chamber, this result being to a large degree brought about by the particular arrangement of the baffles which cause the flow to cascade downwardly over the outer overflow edges 70 of the central baffles and over the inner overflow edges 71 of the side baffles which are relatively vertically staggered. The flow is also divided and recombined by the baffle arrangement as shown by the arrows in Fig. 1, all in the course of downward cascading in such manner as to effectively prevent entrapment of liquid fuel particles. For this purpose, the top surface extent of each baffle in the direction of fluid flow thereon has in relation to its overflow edge an angularity with the vertical not greater than approximately 90 degrees, in order that liquid fuel may be filmed thereon during regulator operation.

In this connection, it will be observed that plate 36 isolates chamber 39 from chamber 17, while at the same time communicating pressure existent in the upper portion of the latter to the former through openings 72 formed in the plate above inlet 54. For this purpose, a laterally extending baffle 73 is interposed between the inlet and opening 72 in such manner as to direct the divided flow of entering fuel around the sides of baffles 65 and toward the passage formed between the inner edges 71 of the first pair of side baffles 67 to which baffle 73 is connected. Notches 74 are formed in the opposite sides of baffle 73 out of the flow path of fuel being directed around the edges of baffle 65 for communicating the pressure existent in the upper portion of chamber 17 to chamber 39 via passage 75 formed at the outer sides of and above baffle 73 and through openings 72 communicating with passage 75. As a result, liquid fuel particles are effectively prevented from entering chamber 39, not only by virtue of the placement of openings 72 above inlet 54, but also by the novel baffle arrangement directing the flow away from the notches 74. It has been found that this arrangement confines the flow of gas and liquid particles to the pressure chamber 17 while serving to communicate pressure alone to chamber 39, whereby the operation and efficiency of the regulator is improved and frost formation is effectively prevented.

Referring again to the baffle arrangement, and particularly to Fig. 1 the cascading downward flow of the fuel through the high pressure chamber 17 will be seen to traverse substantially the entire surface of partition 13 facing chamber 17 in a back and forth movement in such manner as to ensure maximum heat transfer into the flowing gases, establishing conditions favoring complete vaporization of liquid fuel droplets. Since vaporization is accompanied by expansion of the gases, the baffles are arranged in the lower portion of chamber 17 to have increased vertical separation, accommodating the greater volume of the flow. Ultimately, the flowing fuel reaches the bottom portion of chamber 17 and passes beneath curved baffle 76, and from there is led into low pressure chamber 18 through opening 77 controlled by valve assembly 78 to establish, for example, a pressure slightly sub-atmospheric in chamber 18.

Valve assembly 78 typically comprises rubber faced valve body 79 pivoted at 80 for movement toward and away from valve seat 81, a compression spring 82 engaging valve lever 83 serving to urge valve body 79 into outlet closing position. Lower pressure in chamber 18, corresponding to increased fuel demand, is communicated to chamber 29 in the manner previously described and operates to urge diaphragm 26 into engagement with pin 129, causing counterclockwise rotation of valve lever 83 and opening of the valve away from seat 81 to increase the rate of delivery of pressurized fuel from chamber 17 to chamber 18 through opening 77.

Referring briefly to the general operation of the regulator, reduced pressure conditions in chamber 18 cause increased opening of valve assembly 78, tending to raise the delivery rate of fuel to chamber 18 from chamber 17, and as a result, pressure conditions in the latter and in chamber 39 are lowered. Diaphragm 42 is correspondingly moved toward plate 36 to effect increased opening of valve assembly 53 to raise the delivery rate of liquid fuel to the high pressure chamber 17. By virtue of the novel construction of the regulator as described above, fluid expansion through the two pressure stages is accompanied by complete vaporization of fuel droplets and by increased fuel delivery rates, imparting high overall operating efficiency and capacity to the regulator.

I claim:

1. An improved liquid fuel vaporizing pressure regulator, comprising a body containing a substantially vertically extending fuel vaporizing chamber, heating and pressure chambers respectively at opposite sides of and separated from the vaporizing chamber and a passage communicating between the top portion of the vaporizing chamber and the pressure chamber, said body having an inlet and outlet to the vaporizing chamber respectively at upper and lower portions thereof below said top portion and said body including a vertical series of spaced baffles arranged within the vaporizing chamber for receiving liquid fuel flowing through the inlet and in downwardly cascading streams over the baffles toward the outlet, said baffles being staggered in vertical sequence and the top surface extent of each baffle in the direction of liquid flow thereon having in relation to its overflow edge an angularity with the vertical not greater than about 90 degrees for filming liquid fuel thereon, a valve at the inlet for controlling fuel flow therethrough, and means including a diaphragm within said pressure chamber controlling the valve for regulating fuel delivery through the inlet in response to vapor pressure changes communicated from the vaporizing chamber to said pressure chamber through said passage.

2. The invention as defined in claim 1 in which baffles in the lower portion of said chamber have increased vertical separation to accommodate increased vaporization of the fuel flowing toward the outlet.

3. In a fuel vaporizing pressure regulator, a body containing a substantially vertically extending chamber having a fuel inlet and outlet and including a vertical series of spaced baffles for receiving liquid fuel flowing through the inlet, said baffles extending into the chamber from one side thereof and terminating therein with the baffle edges lying in a curved plane, a spring cover plate normally having planar shape differing from said curved plane extending across the chamber and separating the baffled portion thereof as well as said inlet and outlet from the remaining portion of the chamber, means holding said plate in said curved plane so that the plate presses against the baffle edges preventing leakage of fuel thereover, means forming a passage communicating with said two chamber portions, and diaphragm controlled valve means within the chamber for regulating fuel delivery through the inlet in response to vapor pressure changes communicated from the baffled portion to the remaining portion of said chamber through said passage.

4. The invention as defined in claim 3 comprising a passage formed in said plate.

5. The invention as defined in claim 4 comprising a valve at the inlet and a diaphragm within the remaining portion of said chamber controlling said valve.

6. The invention as defined in claim 4 in which the passage is formed in the top portion of the plate and communicates with the top of said baffled chamber portion, and said inlet and outlet are respectively at upper and lower portions of said baffled chamber portion and below the top thereof.

7. The invention as defined in claim 3 comprising baffles staggered in vertical sequence and the top surface of each baffle in the direction of liquid flow thereon having in relation to its overflow edge an angularity with the vertical not greater than about 90 degrees for filming liquid fuel thereon.

8. An improved liquid fuel vaporizing pressure regulator, comprising a body containing a substantially vertically extending fuel vaporizing chamber, heating and pressure chambers respectively at opposite sides of and separated from the vaporizing chamber and a passage communicating between the top portion of the vaporizing chamber and the pressure chamber, said body having an inlet and outlet to the vaporizing chamber respectively at upper and lower portions thereof below said top portion and said body including a vertical series of spaced baffles arranged within the vaporizing chamber for receiving liquid fuel flowing through the inlet and in downwardly cascading streams over the baffles toward the outlet, a valve at the inlet for controlling fuel flow therethrough, and means including a diaphragm within said pressure chamber controlling the valve for regulating fuel delivery through the inlet in response to vapor pressure changes communicated from the vaporizing chamber to said pressure chamber through said passage.

9. The invention as defined in claim 8 including a baffle separating said top portion of the vaporizing chamber from the remainder thereof, said baffle containing an aperture for communicating vapor pressure in the remainder of the vaporizing chamber to the top portion thereof.

10. In a fuel heating pressure regulator, a body containing a chamber having a fuel inlet and outlet and including baffles spaced within the chamber for receiving fuel flowing through the inlet, said baffles extending into the chamber from one side thereof and terminating therein with the baffle edges lying in a plane of predetermined shape spaced from the opposite side of the chamber, a spring cover plate, means holding said cover plate against the baffle edges to divide the chamber into a baffled sub-chamber between the plate and said one side and a second sub-chamber between the plate and said opposite side, said plate normally having planar shape differing from said predetermined plane so that the plate presses against the baffle edges preventing leakage of fuel thereover, said fuel inlet and second sub-chamber communicating with said baffled sub-chamber, and diaphragm controlled valve means for regulating fuel delivery through the inlet in response to pressure changes within said second sub-chamber.

11. The invention as defined in claim 10, comprising body shoulders holding the edge of said plate in displaced condition relative to the plate center.

12. The invention as defined in claim 10 in which said plane is curved and conforms substantially with the planar shape taken by said plate when supported at its edge and uniformly loaded on one side thereof.

13. The invention as defined in claim 12 in which said curved plane is concave toward said baffles.

References Cited in the file of this patent

UNITED STATES PATENTS

| | | |
|---|---|---|
| 1,556,799 | Morrison | Oct. 13, 1925 |
| 1,599,681 | Seligmann | Sept. 14, 1926 |
| 2,248,222 | Ensign | July 8, 1941 |
| 2,272,341 | Holzapfel | Feb. 10, 1942 |
| 2,661,601 | Hart | Dec. 8, 1953 |